(12) United States Patent
Young

(10) Patent No.: US 7,071,462 B2
(45) Date of Patent: Jul. 4, 2006

(54) CALIBRATION SYSTEM AND METHOD TO CORRECT DISTORTION OF THERMAL IMAGES FROM IN-LINE AND ROTARY THERMOFORMING MACHINES

(75) Inventor: Alan Young, Los Gatos, CA (US)

(73) Assignee: Raytek Corporation, Santa Cruz, CA (US)

( * ) Notice: Subject to any disclaimer, the term of this patent is extended or adjusted under 35 U.S.C. 154(b) by 402 days.

(21) Appl. No.: 10/462,858

(22) Filed: Jun. 16, 2003

(65) Prior Publication Data

US 2004/0251407 A1    Dec. 16, 2004

(51) Int. Cl.
*G01J 5/02* (2006.01)

(52) U.S. Cl. .................................. 250/252.1; 250/491.1
(58) Field of Classification Search ............ 250/252.1, 250/491.1, 336.1, 334; 356/237.1, 51
See application file for complete search history.

(56) References Cited

U.S. PATENT DOCUMENTS

| | | | | |
|---|---|---|---|---|
| 4,419,692 A | * | 12/1983 | Modisette et al. | 348/167 |
| 5,124,927 A | * | 6/1992 | Hopewell et al. | 700/121 |
| 6,127,679 A | * | 10/2000 | Ashley et al. | 250/252.1 |
| 6,175,113 B1 | * | 1/2001 | Ashley et al. | 250/334 |
| 6,367,969 B1 | * | 4/2002 | Ringermacher et al. | 374/7 |
| 6,909,800 B1 | * | 6/2005 | Vaidyanathan | 382/152 |

OTHER PUBLICATIONS

Internet search:LANDSCANpro Infrared Linsecanners; LAND Instruments International.*
Raytek Process Imaging Series, *TF100 Process Imaging System for Thermoforming Applications*, 4 pages, 2-5103N Rev. B, Jul. 2001, copyright Raytek Corporation, Santa Cruz, CA.

* cited by examiner

*Primary Examiner*—Otilia Gabor
(74) *Attorney, Agent, or Firm*—Charles E. Krueger

(57) ABSTRACT

A system and method for compensating for geometrical distortion of a thermal image, generated by an infrared line-scanner, caused by non-uniform motion of an image object that utilizes a calibration object and interactive software to form non-rectangular zone boundaries that compensate for image distortion.

8 Claims, 6 Drawing Sheets

CALIBRATION SYSTEM AND METHOD TO CORRECT DISTORTION OF THERMAL IMAGES FROM IN-LINE AND ROTARY THERMOFORMING MACHINES

BACKGROUND OF THE INVENTION

FIG. 1A depicts an existing line-scanning thermal imaging system for thermoforming applications. In FIG. 1A, an infrared line-scanner 10 forms images of a plastic sheet 12 being registered out of a thermoforming machine (not shown). An output signal from the infrared line-scanner 10 is coupled to a first input of a computer 14 via a signal conversion device. Software, executed by the computer 14, generates thermal images of the plastic sheet which can be displayed on a computer monitor screen and also generates output signals, to be described more fully below, which can be supplied in either analog or digital form.

FIG. 1B is a more detailed view of the infrared line-scanner 10. In FIG. 1B, a conveyor mechanism 20 moves plastic sheets 12 output from the thermoforming machine under the field of view of the infrared line-scanner 10. The infrared line-scanner measures a line of 256 points using a rotating mirror that scans a 90° field-of-view up to 48 times per second. Thus, the IR image is formed by rasters of 256 measurement points where each raster line represents a temperature profile for a given raster scan. A two-dimensional temperature distribution or thermal image is formed line by line when the sheet passes across the line-scanner's field of view. The scanning of a sheet can be initiated by the measured temperature, or by an external "trigger" signal. As the heated sheet traverses the field-of-view, a two-dimensional thermal image or "thermogram" is formed. Thermal images are displayed each time the scanned sheet indexes out of the heating section or oven of the thermoforming machine.

An example of an image formed by the data output by the infrared image forming system depicted in FIGS. 1A and B is depicted in FIG. 2. Each scan of the infrared line-scanner forms a raster of image points which are displayed contiguously to form the thermal image depicted in FIG. 2.

Measuring the temperature distribution of a sheet as it exits a thermoforming oven allows thermoformers to adjust the oven heating zone temperatures to achieve the desired degree of sheet temperature uniformity. Data from an infrared line-scanner provides a 2-dimensional thermal image of each sheet exiting the oven.

Thermoforming machines include an oven having heating elements for heating the plastic sheet. In this example, thermoforming software, manufactured by the assignee of the present application, subdivides the measured thermal image (or "snapshot") into a grid of rectangular zones corresponding to the oven's heating zones to allow manual or closed-loop control of each heating element or "zone". This software allows configuration of only rectangular zones because thermoforming ovens also have rectangular heating zones (or clusters of heating elements grouped in rectangular arrays). The software calculates the average temperature of each zone, which is displayed in the corner of each rectangle in the grid. Zones can be tailored to each application depending on heater size and location. Temperatures for each zone are displayed as average, maximum, or minimum values. The serial or available analog outputs, described above, can be configured to provide outputs proportional to each zone's temperature.

FIG. 3 depicts a zone configuration screen 30 displayed by the software to allow creation of the zone grid. A drawing window is provided that is superimposed over the thermal image to allow a user to employ a mouse, or other input device, to create rectangular zones corresponding to, for example, the location of heater elements with respect to a plastic sheet when it is being heated in a thermoforming device.

It is known that an accurate registration of the scanned image to the actual locations of the heating device can only be accomplished if the velocity of the plastic sheet (and hence the conveyer mechanism) is constant. As described above, the infrared line-scanner 10 is static and it is the movement of the sheet that allows the scanned rasters to form a two-dimensional thermal image. However, if, for example, there were acceleration along the axis of motion of the conveyer mechanism, a particular zone would appear reduced in length and would no longer conform accurately to the location of the heating elements.

The distortion of thermal images from an infrared line-scanner on rotary thermoforming machines is well known, but understanding the nature and causes of the distortion have not been previously described. It is not possible to "linearize" or "flatten-out" distorted thermal images, because to do so requires transferring or interpolating "pixels" (one of the 256 measured raster-scanned points) from one area of the thermal image to another and would not result in reconstructing an accurate undistorted thermal image.

In an in-line thermoforming machine, when a plastic sheet indexes out of the oven after being heated, the sheet is transported at variable speed (i.e., the sheet accelerates and decelerates) as it passes through the infrared line-scanner's field-of-view. This non-uniform movement causes the apparent shape of the resulting thermal image to distort thereby preventing the use of the actual size/shape/location of the heating zones to subdivide the thermal image into the corresponding oven heating zone segments.

Thus, with non-linear sheet movement, it is not obvious how to subdivide the resulting thermal image into zones of the correct size/shape. "In-line" or "continuous" thermoforming machines transport the sheet in a straight-line, but at varying speed. Accordingly, zones distort only in the direction of sheet movement (the "machine direction"), but not at right angles to sheet movement (the "cross-machine direction") assuming the line-scanner raster scans exactly in the "cross-machine" direction. For example, sheet acceleration reduces the apparent sheet length on the resulting thermal image (and hence zone length) in the direction of travel (relative to that of a sheet traveling at constant speed), but does not affect the apparent width of the sheet. Likewise, if a sheet decelerates while passing through the line-scanner's field-of-view, the apparent length of the thermal image appears enlarged.

Besides distortion resulting from non-uniform sheet movement, additional distortion results on rotary thermoforming machines because the sheet traverses a curved path resulting in zones of non-rectangular shape and irregular dimension.

In principle, it might be possible to dynamically adjust or correct, in real-time, the resulting thermal image for instantaneous sheet speed changes, but to do so also requires knowledge of the line-scanner/sheet geometry, the location of the line-scanner's scanned line on the sheet and the lateral position and dimensions of the sheet. While theoretically possible, implementing such a method would be complex and costly.

BRIEF SUMMARY OF THE INVENTION

According to one embodiment of the invention, software allows the formation of non-rectangular zone boundaries during calibration that accurately define heating element zones in a distorted thermal image.

According to another embodiment of the invention, a calibration object has rectangular zone boundaries marked thereon to delineate corresponding rectangular heating element zones. An image of the calibration object is used for calibration for non-uniform motion of the calibration object.

According to another embodiment of the invention, software stores the coordinates of the non-rectangular zone boundaries and utilizes the coordinates to calculate temperature parameters characterizing the heating zones.

According to another embodiment of the invention, software accommodates shape distortion of heating zones caused by non-linear sheet movement on rotary thermoforming machines, and can also accommodate the resulting distortion on "in-line" machines. The software also allows measurement of zone averages (i.e., "results") with distorted zone shapes.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1A:
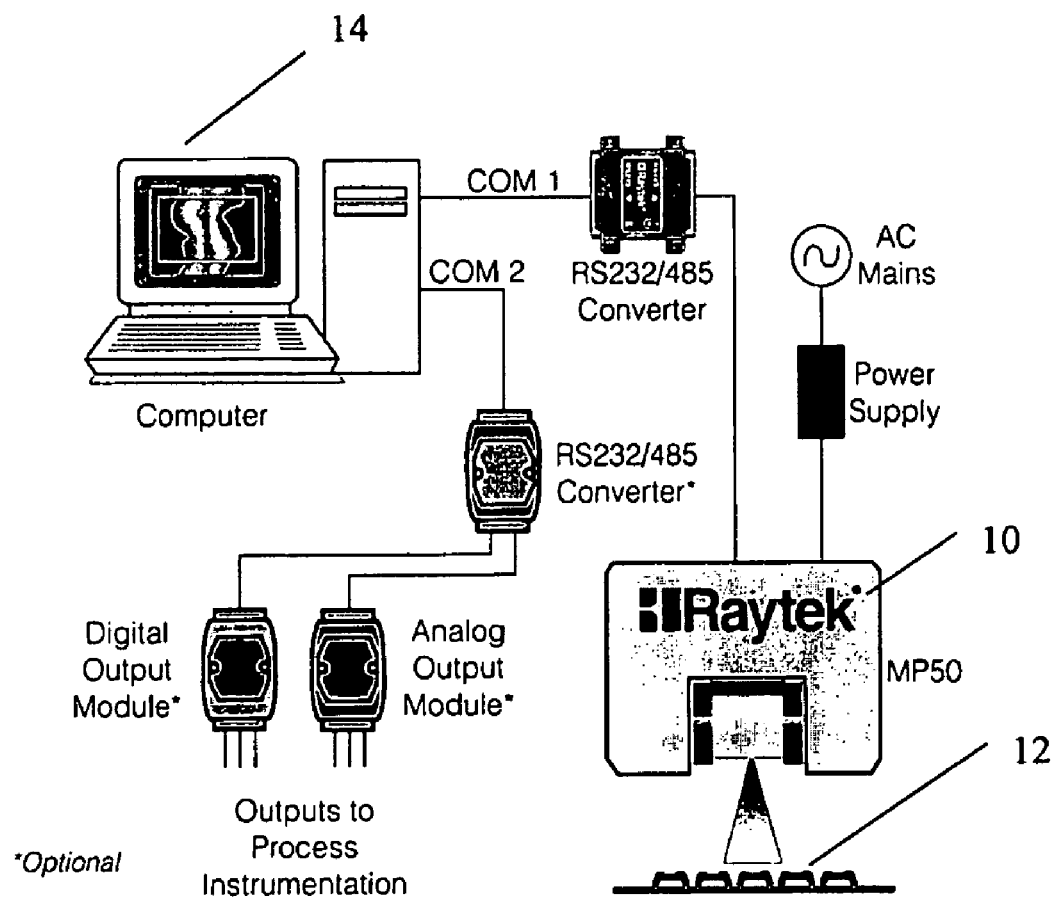
FIG. 1A is a block diagram of an existing thermal imaging system.
Figure 1B:
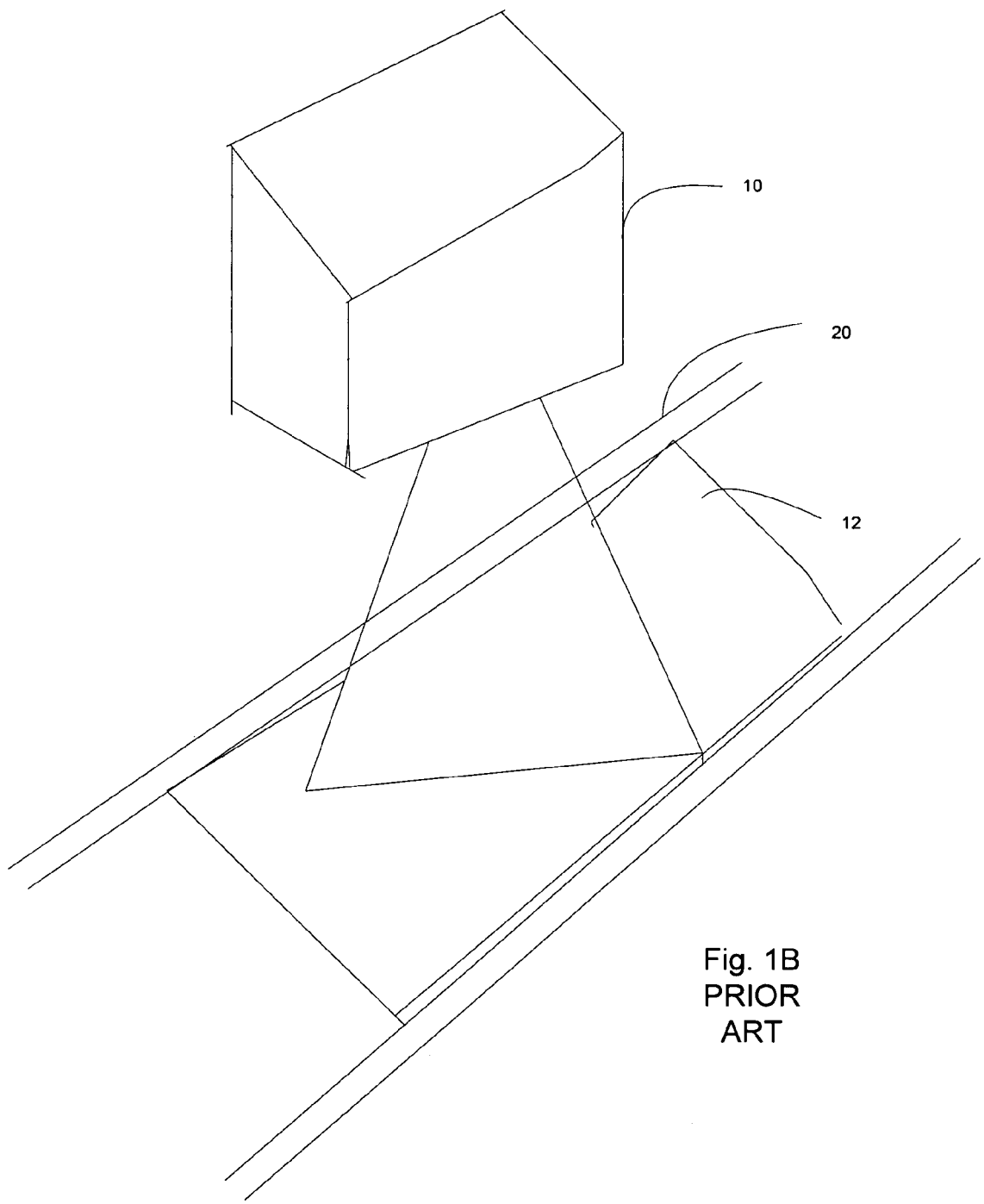
FIG. 1B is a detailed perspective diagram of a thermal line-scanner positioned to image a moving sheet.
Figure 2:
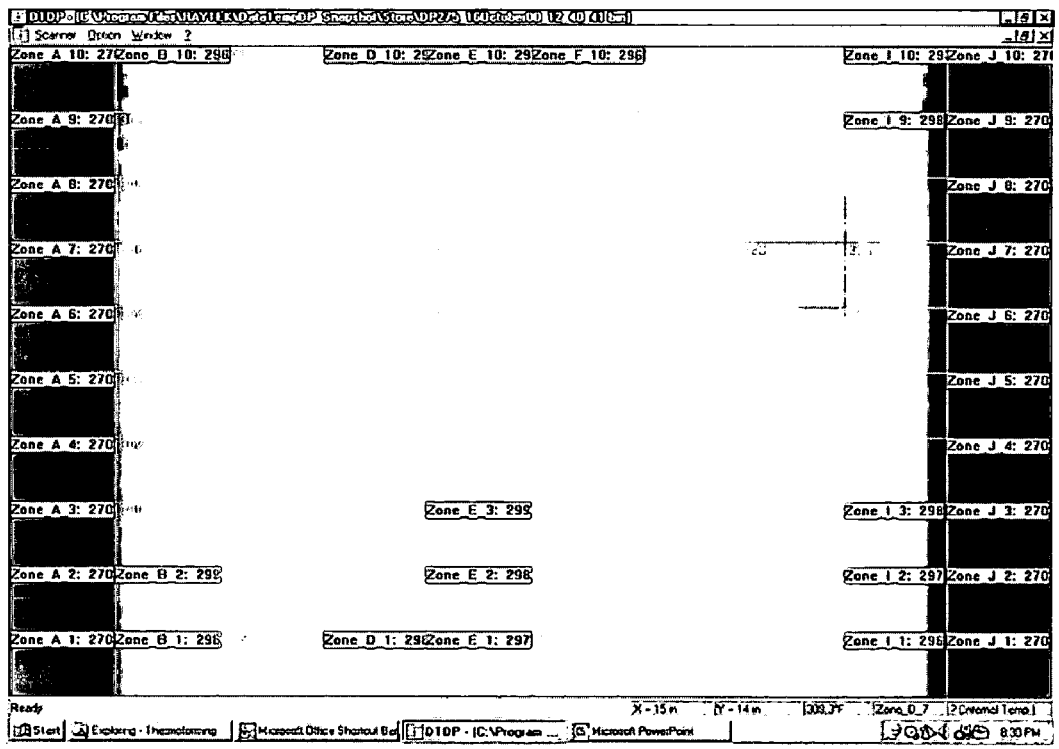
FIG. 2 is a diagram depicting a display of the imaging system of FIGS. 1A and B.
Figure 3:
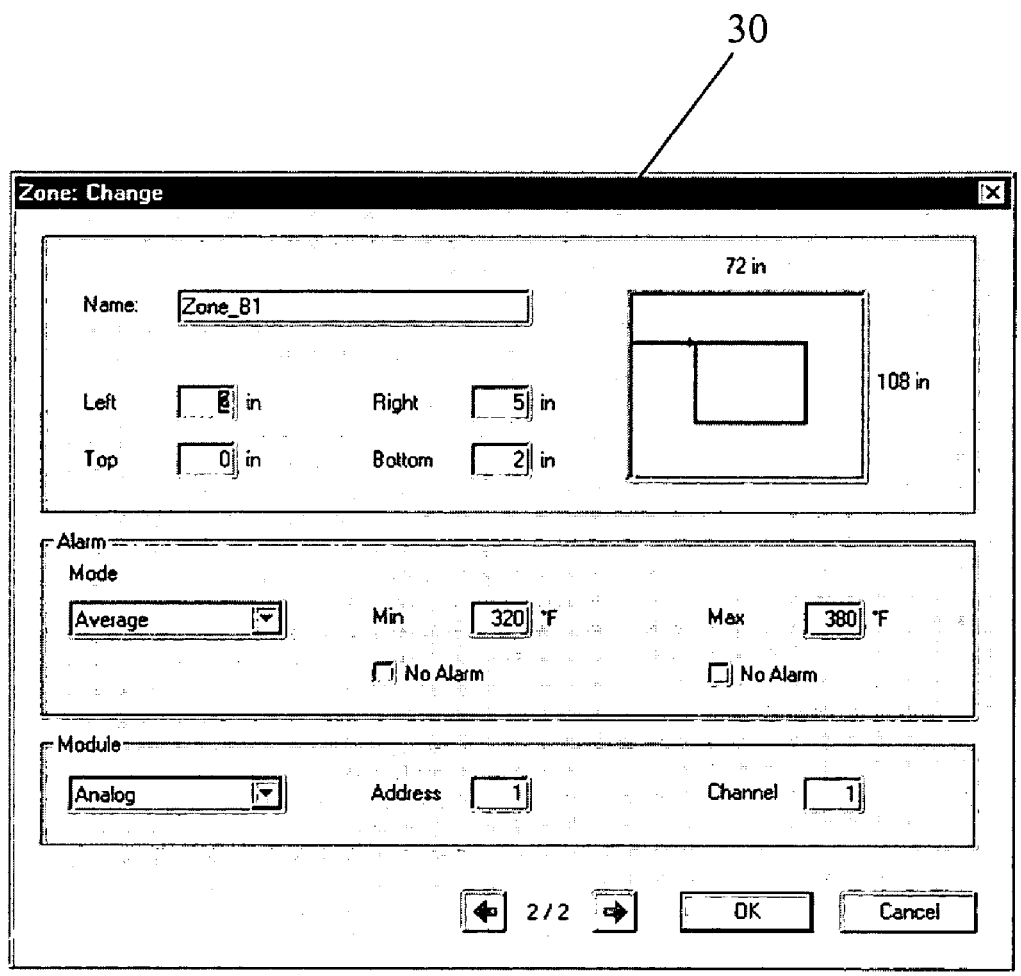
FIG. 3 is a diagram of a zone configuration screen utilized in the existing thermal imaging system.

An overview of an embodiment of the present invention will now be described. Rather than compensate for shape distortion in real-time, this embodiment is a method that calibrates a thermal imaging system for non-uniform sheet movement (and the infrared line-scanner's installation geometry) using a "zone calibrator sheet". The method in this embodiment is practiced in a system similar to that described above with reference to FIGS. 1A and B.

First, a "zone calibrator sheet" is formed that has the oven's heating zones or zone boundaries projected onto its surface and physically defined by a suitable thermally contrasting material such as high-temperature metallic tape or metal strips affixed to its surface. The metallic material appears to the infrared line-scanner as "cold" resulting in a "black" appearance since the comparatively shiny metal surface does not emit substantial infrared radiation.

Figure 4:
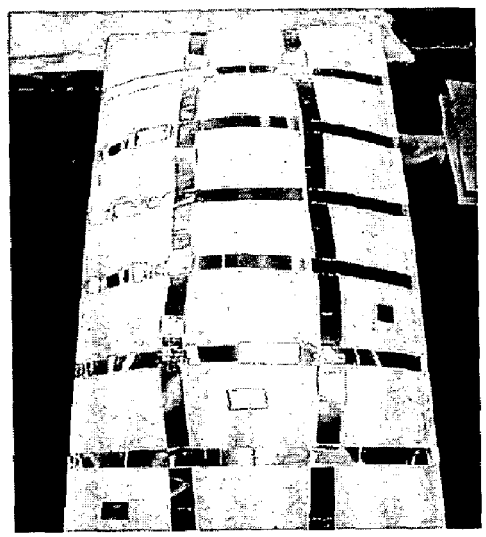
FIG. 4 is a diagram depicting a zone calibrator sheet.

A "zone calibrator sheet" as depicted in FIG. 4 can be used to calibrate zone distortion on in-line/continuous thermoforming machines. Assuming the line-scanner is installed to allow the scan line to be parallel to the cross-machine direction, the resulting thermal image of the "zone calibrator" would appear rectangular, but with the zone size altered in the machine-direction. Tracing zone boundaries, as described for rotary machines below, also applies to defining zones for in-line/continuous thermoforming machines.

Secondly, the "zone calibrator sheet" is installed on a sheet transport mechanism of a thermoforming machine allowing the thermoforming machine to transport the "zone calibrator" across the IR line-scanners' field-of-view. An example of a zone calibrator is depicted in FIG. 4, which shows a plastic sheet with rectangular zones, corresponding to the locations of heating elements under the sheet, defined by aluminum duct tape. Depending on the system, the zone calibrator sheet may or may not be heated prior to imaging.

Figure 5:
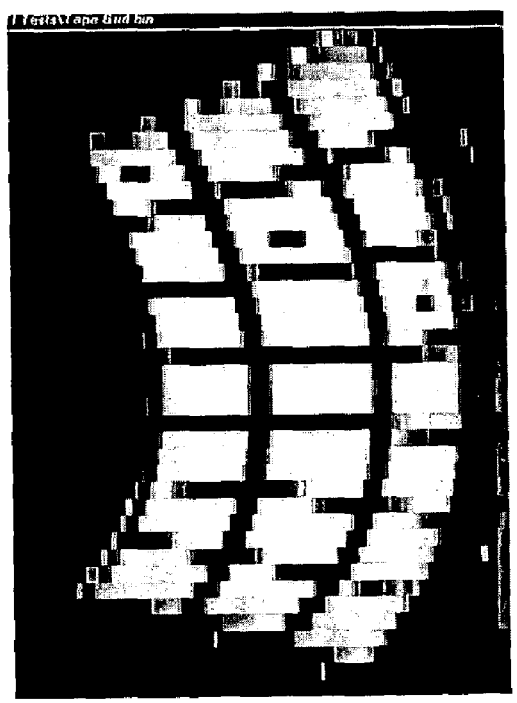
FIG. 5 is a diagram depicting the distorted image of the zone calibration sheet.

The resulting thermal image of the "zone calibrator" allows the zone boundaries and the resulting shape distortion of each zone to be clearly observed and measured. FIG. 5 depicts the distorted image of the zone calibrator sheet upon, exiting the oven on a rotary machine, formed utilizing the infrared line-scanner and imaging software described above. Note that the sheet itself is not distorted but the image formed by the line-scanner and the software is distorted due to the rotary motion of the plastic sheet relative to the stationary infrared line-scanner. The distortion results because parts of each rectangle of the zone grid experience acceleration, which increases with increasing radius (in FIG. 5 to the right of the drawing). The calibrator sheet may or may not have to be heated, depending on the requirements of a particular application.

In this embodiment, software supporting the thermal imaging process allows a user to trace the distorted, non-rectangular "zone calibrator" zone boundaries allowing their size, shape and location to be measured and stored. Such a method accounts for all sources of distortion resulting from non-uniform sheet movement and line-scanner installation geometry. Calibrating and measuring zone distortion in this manner allows the thermal image of each sheet to be correctly subdivided into zones corresponding to heating zones of the thermoforming machine to permit the accurate determination of zone average (or minimum/maximum) temperature.

Figure 6:
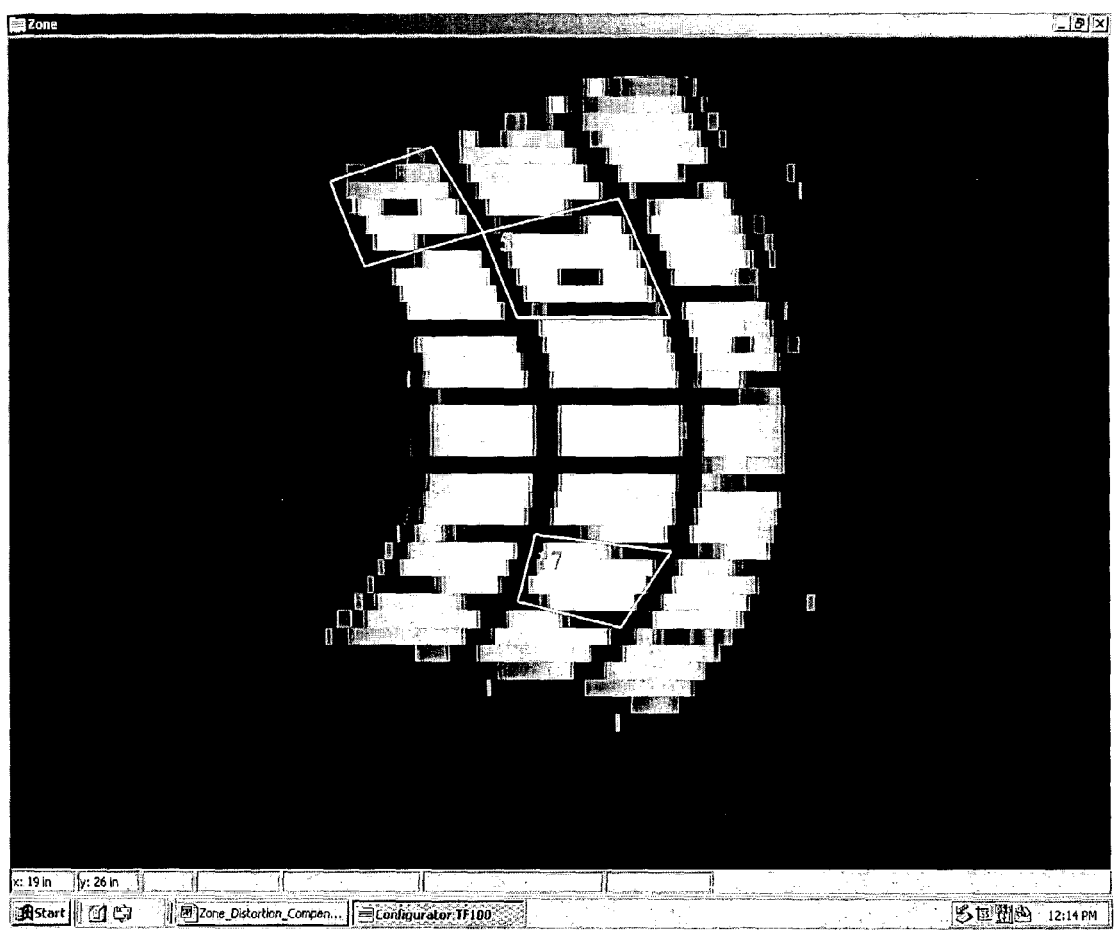
FIG. 6 is a diagram depicting non-rectangular zone boundaries formed over a distorted image.

Referring now to FIG. 6, the software of the presently described embodiment creates a window displaying the thermal image of the "zone calibrator" and permits tracing each zone boundary to define zone boundaries. Measuring the actual distortion of each zone allows accurate definition of zones in terms of their shape, size and location in order to accurately subdivide thermal images into their respective oven heater zones. The software supporting the thermal imaging process allows a user to draw, using for example a mouse, non-perpendicular zone boundaries to define non-rectangular zones. Three such zones (of a total of 21) are illustrated that appear with labels 1, 5 and 17.

The coordinates of the outlined non-rectangular zone are stored so that the zone-outline can be superimposed on the image of each plastic sheet exiting the oven of a thermoforming machine to accurately define the image points corresponding to an associated heating element. The various non-rectangular distorted zones can be juxtaposed to form a non-rectangular grid defining the locations of image points corresponding to each heating element associated with each zone.

Once the zone boundaries have been defined, the software utilizes the boundaries to generate thermal data from each grid. For example, the data points within the parallelogram marked "1" in FIG. 6 correspond to the part of the plastic sheet (work piece) heated by a first rectangular heating element in the thermoplastic forming machine. These data points are processed by the software to determine, for example, the average, maximum, and/or minimum temperature of the work piece in the first zone.

Thus, the software supporting the thermal imaging process allows a user to trace the "zone calibrator" zone boundaries allowing their size, shape and location to be measured and stored. The method accounts for all sources of distortion resulting from non-uniform sheet movement and line-scanner installation geometry. Calibrating and measuring zone distortion in this manner allows the thermal image of each sheet to be correctly subdivided into zones permitting the accurate determination of zone average (or minimum/maximum) temperature. For a particular thermoforming machine and sheet size the calibration need only be performed once. The non-rectangular grid stored in memory can then be employed repeatedly to characterize and analyze the image of each sheet as it exits the machine.

Parts of the invention may be implemented as program code, stored on a computer readable medium that is executed by a digital computer. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. For example, distortions due to linear and circular accelerations have been described but the invention is suitable for use with other geometries. Further, different configurations of the calibration sheet can be used, for example the zones can be marked by occupying entire zones by a contrasting imaging material. Further, as is known in the art, other materials may be utilized to form a calibration sheet. Accordingly, it is not intended to limit the invention except as provided by the appended claims.

What is claimed is:

1. A method for compensating for distortion in a thermal image of a moving object due to non-uniform motion of the object, with the thermal image formed by a thermal scanning system including a fixed infrared scanning device for forming images of part of an object within its field of view and with the infrared scanning device providing a signal output to a computer which executes program code to form a thermal image of the object and calculate temperature values of portions of the object, said method comprising the steps of:

fabricating a calibrator object having thermal zone boundaries marked by a contrasting thermal imaging material;

transporting the calibrator object across the field of view of the infrared scanning device;

executing program code to process signal output from the infrared scanning device to form a thermal image of the object, with images of zone boundaries marked by the imaging material distorted in the image due to non-uniform motion of the calibrator object while the image is being scanned;

executing program code to form a window over part of an image and responsive to user commands to draw an outline of a non-rectangular distorted zone and to store coordinates of the outline of the non-rectangular distorted zone; and executing program code to utilize stored coordinates of the outline of the non-rectangular distorted zone to compute temperature parameters from image points included within the outline of the distorted zone.

2. The method of claim 1 further comprising the step of:
executing program code to display the thermal image with the outline of at least one non-rectangular distorted zone superimposed thereover.

3. The method of claim 2 further comprising the step of:
executing program code to utilize image points bounded by a non-rectangular distorted zone to calculate and output thermal parameters characterizing the portion of the object imaged within the non-rectangular distorted zone.

4. The method of claim 1 further comprising the step of heating the calibrator object in a thermoforming oven and transporting the calibrator object across the field of view of the infrared scanning device using the conveyor mechanism of the thermoforming machine.

5. The method of claim 1 further comprising measuring a calibrator object having thermal zones marked by occupying entire zones with a contrasting thermal imaging material and transporting the calibrator object across the field of view of the infrared scanning device using the conveyor mechanism of a thermoforming machine.

6. A computer program product, for use on a system including a digital computer, where the computer program product compensates for distortion in a thermal image of a moving object due to non-uniform motion of the object, with the thermal image formed by a thermal scanning system including a fixed infrared scanning device for forming images of part of an object within its field of view and with the infrared scanning device providing signals to a the digital computer, the computer program product comprising:

a computer usable medium having computer readable program code physically embodied therein, said computer program product further comprising:

computer readable program code for causing the computer to form a thermal image of a calibration object having thermal zones marked by a contrasting thermal imaging material and transported across the field of view of the infrared scanning device, with the thermal image of the zone boundaries distorted due to non-uniform motion of the calibration object across the field of view of the infrared scanning device;

computer readable program code for causing the computer to form a window over part of an image and responsive to user commands to draw an outline of a non-rectangular distorted zone and to store coordinates of the outline of the distorted zone; and computer readable program code for causing the computer to utilize stored coordinates of the outline of the non-rectangular distorted zone to compute temperature parameters from image points included within the outline of the distorted zone.

7. The computer program product of claim 6 where said computer readable program code for causing the computer to utilize stored coordinates of the outline of the distorted zone to compute temperature parameters further comprises:
    computer readable program code for causing the computer to calculate and display the average, maximum, or minimum temperature of a selected non-rectangular distorted zone.

8. The computer program product of claim 6 further comprising:
    computer readable program code for causing the computer to display the thermal image with the outline of at least one non-rectangular distorted zone superimposed thereover.

\* \* \* \* \*